Nov. 22, 1960
R. J. RAINAR
2,961,029
METHOD OF MAKING RESILIENT SMOOTH-SURFACED
FLOOR COVERING MATERIALS
Filed June 7, 1956
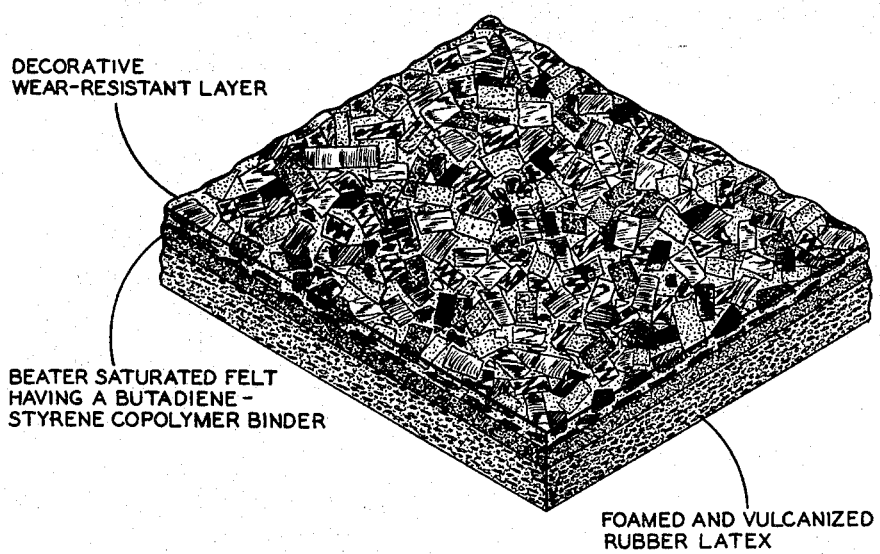
DECORATIVE
WEAR-RESISTANT LAYER
BEATER SATURATED FELT
HAVING A BUTADIENE -
STYRENE COPOLYMER BINDER
FOAMED AND VULCANIZED
RUBBER LATEX
INVENTOR
ROBERT J. RAINAR
ATTORNEY

2,961,029
METHOD OF MAKING RESILIENT SMOOTH-SURFACED FLOOR COVERING MATERIALS

Robert J. Rainar, Manor Township, Lancaster County, Pa., assignor to Armstrong Cork Company, Lancaster, Pa., a corporation of Pennsylvania Filed June 7, 1956, Ser. No. 589,858

10 Claims. (Cl. 154—25)

This invention relates generally to resilient smooth-surfaced floor covering materials, and more particularly to such floor covering materials having a foam backing. Still more particularly, it relates to a foam-backed floor surfacing material which possesses to a high degree the requisite characteristics of a sturdy, long-lived, comfortable flooring material. The invention also relates to a method of making such floor surfacing materials.

In the past, one or more layers of a rubber foam or cellular structure have been placed on various other materials in order to impart a soft, resilient structure to the finished article. Such articles have been useful as upholstery, shoe products, crash pads, table coverings, and articles of wearing apparel such as brassieres. There has not been developed, however, any practical method for making a resilient smooth-surfaced flooring material which incorporates a foam rubber backing as an integral part of the flooring. There has been good reason for this situation.

Flooring materials must possess certain characteristics to be useful. They must be strong, wear-resistant, water- and alkali-resistant. Additionally, they must feel comfortable under foot; they must not emit a hollow sound when the foot strikes the wearing surface. They must possess unusual indentation properties in order that heavy furniture and heavy traffic will not permanently deform the flooring. They must be so manufactured that they can be permanently adhered to a subfloor by means of adhesives and must lend themselves to installations of intricate shape and varied pattern. Additionally, most flooring materials must be fabricated on equipment which utilizes heat and pressure and which forms a hard, non-porous article in order to meet the above-described requirements. This type of manufacturing process is exactly the opposite of the type of procedure necessary to form an article to which a rubber foam will adhere.

Although foam rubber articles in the form of sheets and pads have been used as underlayments for soft-surfaced rugs and carpets, such underlayments cannot be used for the resilient smooth surface floorings in view of the peculiar requirements of such floorings. Thus, not only has there not been described in the past a unitary article of a wearing surface and a foam backing as a flooring, but it has not been possible to achieve a combination of smooth surface resilient flooring on a supporting layer and a foamed rubber underlayment by any practical means.

It is the primary object of the present invention to present a resilient smooth-surfaced flooring having as an integral part thereof a foamed rubber backing; no adhesives of any kind are present in the flooring. It is a further object to present such a flooring material which possesses the requisite stringent characteristics which necessarily define a suitable floor covering. A further object is to present a method of making such a floor covering. Other objects and advantages will be apparent in the discussion below.

The invention contemplates a resilient smooth surface floor covering comprising in combination a water-repellent beater saturated felt containing butadiene-styrene copolymer deposited on the felt fibers as a binder for the fibers. Adhered to one surface of the felt without adhesives is a decorative wear-resistant layer, preferably of linoleum composition or of a vinyl chloride resin-plasticizer-filler composition. Adhered to the other surface of the felt without adhesives is a layer of foamed and vulcanized latex containing at least about 50% by weight mineral filler based on the weight of rubber solids in the foam.

The attached drawing illustrates the laminate structure of the floor covering prepared by the process of the present invention.

One of the surprising features of the present invention is that the backing material for both the wearing surface and the foamed rubber layer must meet certain narrow and rigid requirements. Backings for foamed rubber used in the past for other products have all achieved good key—that is, good adhesion between the foamed rubber and the backing, by mechanical means. The foam has physically penetrated the fabric backing and on vulcanization has become firmly and mechanically fixed. This type of mechanical key is not possible with a floor covering, since the backing must possess characteristics of strength, flexibility, and others not met in any but the flooring art. The backing in the flooring art is of such nature that a permanent chemical and/or mechanical key between the backing and the foam has been difficult, if not impossible, to obtain. Yet a strong, firm key between the backing and the foam is essential if the flooring is to remain in place in use once it has been permanently installed on the sub-floor by the use of adhesives. It has now been found that a strong permanent chemical and/or mechanical key can be obtained so long as certain conditions are met.

The backing for flooring materials must be prepared in a certain way with certain ingredients if the backing is to serve as a support, both for a suitable decorative wearing surface and a suitable foam backing. In the first place, the supporting layer must be a felted product as opposed to a fabric. Secondly, the fibers in the felt must be coated with a butadiene-styrene copolymer in order that a proper chemical key can be achieved between the felted supporting layer and the foamed rubber backing. A felt having these characteristics must be prepared by the beater saturation process if it is to possess the requisite strength for use in flooring materials. The term "beater saturated felt" as used herein defines a felt prepared by well-known beater saturation technics.

The fibers from which the felt is made may be of various kinds. Rag furnish is preferred, but there may also be used asbestos, cotton linters, and other long fibers commonly used in the manufacture of felt as a supporting layer in flooring materials.

The material to be deposited on the fibers in a chest is critical. The binder must be a butadiene-styrene copolymer containing between about 20% and 55% styrene, usually between 45% and 50% styrene, and preferably about 50% styrene. It is completely unexpected to find that the butadiene-styrene copolymers are the only operable binders in the present invention. Neoprene (polychloroprene) does not possess the proper aging characteristics for a flooring felt binder and does not allow a good permanent chemical key between the felt and the foam rubber. Additionally, the acidic nature of neoprene has an adverse effect on the felt. Butadiene-acrylonitrile copolymers do not allow the formation of a suitable key between the felt and the foam in flooring applications. Natural rubber does not form suitable sheets for flooring applications by the beater saturation technics. Asphalt saturated sheets act like neoprene saturated sheets; they result in poor permanent keys between the felt and the foam and additionally attack and deteriorate the foam. Alkyd resins commonly used to after-impregnate flooring felts do not allow the formation of a permanent key of sufficient strength between the felt and the foam; additionally, driers used in the oil alkyds cause rapid aging of the natural rubber foam. Thus, out of a large list of binder material normally used in flooring felts to achieve the necessary water repellency and other physical characteristics, only the butadiene-styrene copolymers are suitable. This is completely unexpected.

It is essential that the butadiene-styrene copolymers be placed on the fibers by the beater saturation technic and not by one of the many after-impregnation technics. If an attempt is made to impregnate a felt with butadiene-styrene copolymers after the felt has been formed, incomplete impregnation takes place. This will be true unless the felt is loosely made to allow adequate penetration of the butadiene-styrene copolymer. But in such case the felt is then insufficiently strong to serve as a support for the decorative wearing surface for flooring materials. This is also true of felts after-impregnated with natural rubber.

The amount of butadiene-styrene copolymer to be deposited on the fibers may vary within certain limits. Amounts less than about 10% by weight copolymer based on the dry weight of the fibers do not yield a sufficiently strong sheet for flooring purposes, and additionally begin to diminish the strength of the chemical key between the beater saturated felt and the foam backing. On the other hand, more than about 80% by weight butadiene-styrene copolymer based on the dry weight of the fibers produces a rubbery sheet which may be too flexible and which has poor cutting characteristics when serving as a supporting layer for a decorative wearing surface in flooring materials. About 15%-30% by weight copolymer is preferred.

Although the wearing surface may be any of those decorative wearing surfaces customarily employed in the flooring art, such as printed films, rubber compositions, and other surfacing materials, it is preferred that the wearing surface be a linoleum composition or a vinyl chloride resin-plasticizer-filler composition.

Linoleum compositions are made from linoleum cement and filler such as wood flour, finely ground calcium carbonate, and other conventional fillers and other additives. Linoleum cements typically are made from a drying oil and a resin, usually rosin, by a number of methods which result in the production of a siccative oil-resin gel by oxidizing and polymerizing the drying oil, generally in the presence of the resinous material. Such cements are generally made with linseed oil, although in recent years the linseed oil has been replaced wholly or in part by tall oil, tall oil fatty acids, or tall oil esters. The linoleum compositions may contain small amounts of a compatible synthetic rubber. In any case, the linoleum compositions are calendered onto sheets and the resulting product cured and otherwise treated to produce the well-known linoleum so useful as a flooring material.

In recent years, a resilient smooth surface floor covering has been produced by forming a composition containing filler and a binder that includes a vinyl chloride resin and a plasticizer for the resin, preferably of the ester type. The composition is calendered into a sheet or it may be molded or otherwise formed, and then it may be adhered to a backing. The vinyl chloride resin may be polyvinyl chloride or a polyvinyl chloride-vinyl acetate copolymer usually containing about 2%-15% by weight vinyl acetate, or mixtures thereof. The binder generally contains between about 70% to about 90% by weight of the vinyl chloride resin and about 30% to about 10% by weight of the plasticizer or plasticizer mixture. Compatible synthetic rubbers may be present. When admixed with filler, the filler generally comprises about 50% to about 70% by weight of the wearing surface composition. The filler may include a preponderant portion by volume of fibrous filler such as wood flour, cork particles, asbestos and other mineral fibers, and the like. The remainder or the total of the filler component is comprised generally of finely divided particles such as whiting (calcium carbonate), clay, silica, slate flour, and similar nonfibrous filler material. The final mixture may also include small but effective amounts of well-known vulcanizing agents, curing accelerators, lubricants, pigments, and the like, particularly where a curable synthetic rubber is admixed with the vinyl chloride resin. The total amount of such compounding agents, when used at all, is generally up to about 10% by weight of the filler. In addition to the plasticizers such as dioctyl phthalate, butyl octyl phthalate, and tricresyl phosphate, other well-known plasticizers such as epoxidized drying oil acids may be used.

The synthetic rubber latex from which the foam backing is prepared may be made by emulsion polymerization by methods well-known in the prior art. The latex to be formed is one of high rubber content, for example 50% to 72%, and may be prepared in low or high solids concentration directly by emulsion polymerization or by centrifuging, creaming, or otherwise concentrating low solids latices. Conventional modifying agents such as vulcanizing agents (preferably sulfur), antioxidants, emulsion stabilizers, thickening agents, accelerators, gelling agents, fillers, coloring agents, and other modifying materials are added to the latex prior to or during the foam formation operation.

The emulsifying agents used in the practice of this invention are the soaps and other organic chemical compounds which have both hydrophilic and hydrophobic radicals so as to promote the mixing of oil- and water-miscible ingredients in the latex and stabilize the emulsions so formed. A wide variety of these compounds is known and available commercially. For example, potassium oleate soap, rosinate soaps, sodium stearate, potassium lauryl sulfate, sulfonated hydrocarbons, and sodium alkyl naphthalent sulfate are examples of typical wetting agents useful in stabilizing the latex emulsions. In the practice of the present invention, it has been found that a soap formed from a mixture of higher fatty acids containing linoleic, linolenic, and oleic acids yields a more desirable soap on treating the acids with the amount of potassium hydroxide solution needed for neutralization. For the purposes of a flooring backing, a foam prepared with a mixture of these soaps is superior to a foam prepared with the earlier described more conventional soaps. These latter emulsifying agents serve an additional role of foaming agents and further aid in maintaining the froth or foam in a stable form until the curing operation is completed.

The foamable latex composition must contain a gelling agent to induce the formation of a stable solid foam. Sodium fluorosilicate ($NA_2SiF_6$) is the gelling agent of choice, although ammonium sulfate, ammonium nitrate, and 2-nitro-2-methyl-1-propanol may be used. Although it occasionally may be desirable to use two or more gelling agents, for example sodium fluorosilicate and ammonium sulfate, such is not necessary.

Sensitizers, antioxidants, and ultra accelerators should be used as is conventional in the rubber art. A common sensitizing agent for foam useful in the flooring art is triethyl trimethylene triamine sensitizer sold under the name "Trimene Base." The antioxidant may be phenyl-beta-naphthalamine, di-beta-naphthol-para-phenylenediamine, and the heptyl diphenylamines. Suitable ultra accelerators are activated dithiocarbamate (Setsit-5, Setsit-9), zinc dimethyldithiocarbamate, zinc diethyldithiocarbamate, zinc dibutyldithiocarbamate, or others which provide maximum curing activity.

Modifying agents such as castor oil may be added to improve the elastic properties of the foam, although with a foam to be used for flooring materials, care must be taken not to render the foam too elastic. In view of the use as a flooring, the cell tack in the foam must be reduced, and this can be accomplished best by the addition of a wax emulsion such as an emulsion of paraffin wax in water. Fillers such as carbon black, magnesium oxide, zinc oxide, and preferably calcium carbonate, should be added to stiffen the foam. Carbon black may serve this role and in addition will serve to impart color to the final product. Dyes or pigments may be added to control the color as desired.

It is in the filler content that the foam suitable for use in the combination of the present invention departs most widely from prior foams. Prior foams seldom, if ever, exceed a filler content of about 35% by weight based on the weight of the rubber solids. Such a low loading has been found unsuitable for use in a flooring material. The foam must contain at least about 50% by weight mineral inorganic filler based on the weight of the rubber solids in the foam and preferably about 75% by weight in order that the foam will exhibit suitable compression characteristics to be useful in combination with the decorative wear surface and the felt supporting layer described earlier. The preferred filler is a finely ground mineral inorganic filler customarily employed in the rubber art, or equivalent fillers giving suitable compression characteristics. These fillers are readily dispersible in latices. Among the preferred mineral inorganic fillers are calcium carbonate, clays, silica, slate flour, and the like; calcium carbonate filler is the filler of choice.

The latex to be used in preparing the foam useful in the present invention should be either a natural hevea latex or one which has been replaced to the extent of up to about 50% by weight with a butadiene-styrene copolymer latex; preferably the latex will be a 70:30 rubber latex mixture of hevea:butadiene-styrene copolymer. The latex should be blended with the sensitizer and the soap, and the vulcanizing dispersion, in part or all, added along with the wax emulsion, and the mixture allowed to mature. The rate of maturation depends both on time and temperature, the higher the temperature, the shorter the time. A good time temperature relationship has been found to be 16 hours at about 85° F. During maturation, the mix must be maintained under proper agitation such that no settling out of any of the ingredients occurs but such that no air is beaten into the mix.

The matured batch is then mixed with further small amounts of the triethyl trimethylene triamine sensitizer and the potassium fatty acid soap. The ultra accelerator, the pigments, and the inorganic mineral filler, or equivalent, are also added and thoroughly intermixed with the other ingredients. The filler is preferably added in the form of a slurry.

The compounded and matured latex is then vigorously agitated or whipped with air, nitrogen, or the like to produce a froth or a foam. Suitable apparatus to accomplish the foaming is the Oakes foamer or blender, a Hobart foamer, a Marco foamer, or any device which will incorporate a gas into the mixture to form a foam. To prevent premature coagulation, it is preferred that the zinc oxide in the form of a slurry be added at the foaming head. The sodium fluorosilicate or equivalent gelling agent may also be added at the foaming head, but it is preferred to add the fluorosilicate during an additional blending operation subsequent to the actual frothing or foaming operation. Thus, a preferred embodiment of the process contemplates adding the zinc oxide slurry at the foaming head during froth or foam formation, passing the foam to a secondary blender, adding the sodium fluorosilicate at this point, and then distributing the final mixture to the point where it is to be applied to the felt supporting layer. The temperature during the foaming steps is preferably maintained within the range of about 50°–75° F., and more preferably between about 55°–60° F.

The foam is delivered to the point where used by means of flexible hoses. Since a continuous process is the only practical type of process for flooring applications, the foam is delivered to a point where it may be placed upon the felt-wearing surface combination described earlier. The combination may be unrolled and passed down a table underneath a doctor blade, or roll or similar device, felt side up. The foam is deposited along the width of the moving felt to form a puddle or bank of foam behind the doctor mechanism. The doctor mechanism should preferably be chilled to retard premature coagulation of the foam. The thickness of the foam deposited is easily adjusted by maintaining the proper spacing between the doctor mechanism and the felt. For flooring material application, the foam thickness will vary between about $\frac{1}{32}''$ and $\frac{1}{4}''$. The stiffness and flexibility characteristics of the decorative wearing surface determine to a significant extent the thickness of the foam on the other side of the felt. Stiffer wearing surfaces call for thicker foam backing.

Once the foam has been deposited on the felt supporting layer, sufficient time must be allowed for the foam to gel. The time is largely controlled by the amount of gelling agent added, which should be such that gelation occurs within about 2 to 5 minutes from the time the foam has passed beneath the doctor mechanism. If the gel time of the foam is too short, the foam may gel in the bank behind the doctor mechanism. If the gel time is too long, the felt supporting layer may absorb sufficient water to destroy the structure of the foam. Gel time is also related to some extent to the water absorptivity of the felt. It is for this reason that the felt must have some degree of water-repellency. Otherwise the foam structure would be destroyed as soon as the ungelled foam contacted the felt.

Subsequent to gelation, the foam is cured or vulcanized by heating to an elevated temperature, preferably in the range of about 175°–210° F. until the foam is dry and cured. A preferred embodiment of the present invention entails heating and curing the foam under radiant heaters. Alternatively, the flooring may be suspended in suitable stoves or ovens which are then raised to the requisite temperature and maintained at that temperature until drying and curing are completed.

The following examples illustrate specific embodiments of the present invention:

*Example I*

A felt supporting layer measuring 0.043" in thickness was made by the beater saturated technic from a rag furnish on which had been deposited 20% by weight butadiene-styrene copolymer (50% styrene) based on the dry weight of the fibers.

The following mixture was formed into a sheet, cooled, and broken up into chips.

|  | Pounds |
|---|---|
| 50:50 mixture of vinyl chloride-vinyl acetate copolymer containing 5% vinyl acetate, and vinyl chloride-vinyl acetate copolymer containing 13% vinyl acetate | 157 |
| Vinyl chloride-vinyl acetate copolymer containing 5% vinyl acetate | 94 |
| Butyl octyl phthalate-dioctyl phthalate mixture containing 60% by weight dioctyl phthalate | 24 |
| Dioctyl phthalate | 23 |
| Epoxidized soya bean fatty acids | 8.5 |
| Barium, cadmium soap | 8 |
| Disodium orthophosphate on clay carrier (Vanstay L) | 3.5 |
| 50-mesh limestone plus pigments | 452 |

The chips were deposited on the felt supporting layer and subjected to heat and pressure in molding presses to consolidate the mixture on the felt.

After cooling, the above material, felt side up, was passed down a table, at one end of which was mounted a doctor roll in the form of a chilled cylinder. Foam was delivered along the width of the felt supporting layer behind the doctor roll.

The foam was made as follows.

A latex dispersion was made containing the following ingredients.

| Ingredients | Lbs., Wet | Lbs., Dry |
|---|---|---|
| Natural latex; 62.5% solids | 112 | 70 |
| Butadiene-styrene copolymer latex (50% styrene); 62.5% solids | 48 | 30 |
| Triethyl trimethylene triamine sensitizer (trimene base) | 0.5 | 0.5 |
| Soap (potassium salt of linoleic, linolenic, and oleic acids); 20½ solids | 2.5 | 0.5 |

A vulcanizing dispersion containing the following ingredients was well dispersed in water to achieve 50% solids and was added to the above latex composition.

Ingredients: Pounds
Sulfur _____ 2
Zinc diethyl dithiocarbamate (ethyl Zimate) ___ 1
Sym. di - beta - naphthyl - p - phenylene diamine (agerite white) _____ 1
Zinc salt of mercaptobenzothiazole (Zetax) ____ 1

Three pounds of a wax emulsion of paraffin and water containing about 50% solids was added to the above two mixtures. The entire mixture was then maintained at 16 hours at a temperature of 85° F. while maintaining the mixture under agitation to prevent incorporation of air but to maintain the solids in suspension.

To 172.5 pounds of the matured batch there was added 1 pound of the sensitizer and 1 pound of the soap, 0.5 pound of an ultra accelerator, namely activated dithiocarbamate (Setsit 5), and 100 pounds of a 75% slurry in water of finely divided calcium carbonate ("Calwhite T"). When the composition was thoroughly mixed, it was delivered to an Oakes foamer, where the above amount was blended continuously and proportionately with 10 pounds of a 50% water slurry of zinc oxide in the presence of nitrogen gas under pressure. The foam from the Oakes foamer head was passed to an Oakes blender, where it was proportionately admixed with 2½ pounds (dry basis) sodium fluorosilicate slurry containing 20% solids. From the Oakes blender, the foam was delivered by means of flexible hoses to the point behind the doctor roll as described above.

The doctor was set to deliver a finished foam thickness of 0.045"–0.050" (after cure). The rate of feed of the felt supporting layer was 12 feet per minute. The rate of the foam feed was adjusted to maintain a minimum bank behind the doctor roll.

After passing under the doctor roll, the felt carrying the foam traveled down a table where inspection showed that it gelled in 4 minutes. The foam was then passed under radiant heaters maintained at a temperature of 480°–520° F. Good cure resulted.

The cured foam backing exhibited unusually strong adherence to the felt supporting layer. This is to be contrasted with the key existing between a foam-backed product prepared as described above save that the felt binder is a butadiene-acrylonitrile copolymer. In this latter case, the foam was readily peeled from the backing even by hand.

The product made as described in this example possessed all the requisites of a heavy-duty flooring material. Test installation brought to light the surprising fact that the marks left by heavy furniture standing for extended periods on the flooring material were not as noticeable in the case of the foam-backed material as they were in the case of similar materials prepared on more conventional felts without a foam backing; residual indentation of foam-backed material was superior to that of non- foam-backed material. Additionally, the standing due to traffic and other causes of the foam-backed material was appreciably less than that noted in the conventional flooring materials. The foam-backed material was quieter and more comfortable under foot and did a better job of eliminating show-through of floor irregularities.

Example II

A felt was prepared as in Example I.

Linoleum composition was prepared from 73 parts by weight wood flour, 117 parts by weight "Whiting" (calcium carbonate), and 112 parts by weight of a standard linoleum cement made of an oxidized mixture containing 56% of the partial esters of tall oil and pentaerythritol and 44% linseed oil. The composition was sheeted out to form blankets, and the blankets were adhered to the felt by hot calendering in accordance with known methods. After curing at 195° F. for 12 days, the product was delivered to the table for the application of foam.

A foam similar to that applied in Example I was used, save that the starting rubber latex consisted of 160 pounds of natural latex; no butadiene-styrene copolymer latex was used.

After application and cure of the foam in accordance with Example I, a flooring material resulted which, on test installation, proved itself to be comfortable under foot, strong, wear- and stain-resistant, and superior to the same flooring without the foam backing.

I claim:

1. The method of making a resilient smooth-surfaced floor covering comprising forming a water-repellent, beater saturated felt containing butadiene-styrene copolymer deposited on the fibers as a binder therefor, depositing on one surface of said sheet a decorative wear-resistant layer, subjecting said layer to elevated temperatures, supplying to the other surface of said felt a mass of foamed latex containing a vulcanizing agent, a gelling agent, and at least about 50% by weight filler based on the weight of rubber solids in said latex, leveling off said mass to form a foamed latex layer of even thickness in the range of 1/32" to 1/4", gelling said foamed latex layer, and heat treating said foamed latex layer to cause drying and vulcanization thereof.

2. The method according to claim 1 wherein said decorative wear-resistant layer comprises linoleum composition.

3. The method according to claim 1 wherein said decorative wear-resistant layer comprises a vinyl chloride resin-plasticizer-filler composition.

4. The method according to claim 1 wherein said foamed latex contains about 75% by weight mineral filler based on the weight of rubber solids in said latex.

5. The method according to claim 1 wherein said beater saturated sheet contains about 10%–80% by weight butadiene-styrene copolymer deposited on the fibers.

6. The method according to claim 5 wherein said felt contains about 20% by weight butadiene-styrene copolymer deposited on the fibers.

7. The method of making a resilient smooth-surfaced floor covering comprising forming a water-repellent, beater saturated sheet containing butadiene-styrene copolymer deposited on the fibers as a binder therefor, depositing on one surface of said sheet a wear-resistant layer selected from the group consisting of linoleum composition and vinyl chloride resin-plasticizer-filler composition, subjecting said layer to heat and pressure, supplying to the other surface of said felt a mass of foamed latex of at least 50% by weight natural latex and containing a vulcanizing agent, a gelling agent, and about 75% by weight mineral filler based on the weight of rubber solids in said latex, leveling off said mass to form a foamed latex layer of even thickness in the range of 1/32" to 1/4", gelling said foamed latex layer, and heat treating said foamed latex layer to cause drying and vulcanization thereof.

8. The method according to claim 7 wherein said foamed latex comprises a mixture of about 50% by weight natural rubber latex and about 50% by weight butadiene-styrene copolymer latex based on the weight of the rubber solids.

9. The method according to claim 7 wherein said foamed latex comprises a mixture of about 70% by weight natural rubber latex and about 30% by weight butadiene-styrene copolymer latex based on the weight of rubber solids.

10. The method according to claim 7 wherein said mineral filler comprises calcium carbonate.

References Cited in the file of this patent

UNITED STATES PATENTS

| | | |
|---|---|---|
| 1,912,671 | Van Horn | June 6, 1933 |
| 2,163,289 | Pennel et al. | June 20, 1939 |
| 2,458,750 | Trepp | Jan. 11, 1949 |
| 2,626,886 | Scholl | Jan. 27, 1953 |
| 2,629,678 | Thompson et al. | Feb. 24, 1953 |
| 2,720,476 | Baymiller | Oct. 11, 1955 |
| 2,759,865 | Kolb | Aug. 21, 1956 |
| 2,802,765 | Baymiller | Aug. 13, 1957 |
| 2,816,852 | Banks | Dec. 17, 1957 |

FOREIGN PATENTS

| | | |
|---|---|---|
| 883,341 | Germany | July 16, 1953 |

UNITED STATES PATENT OFFICE
CERTIFICATION OF CORRECTION

Patent No. 2,961,029          November 22, 1960

Robert J. Rainar

It is hereby certified that error appears in the above numbered patent requiring correction and that the said Letters Patent should read as corrected below.

Column 1, line 34, for "posses" read -- possess --; column 4, line 41, for "naphthalent" read -- naphthalene --; line 53, strike out "a"; column 7, lines 7 to 15, in the table, first column thereof, last line, for "20½" read -- 20% --, column 8, line 1, for "standing" read -- staining --.

Signed and sealed this 2nd day of May 1961.

(SEAL)
Attest:

ERNEST W. SWIDER
Attesting Officer

DAVID L. LADD
Commissioner of Patents